United States Patent [19]

Wolgemuth et al.

[11] 3,900,655

[45] Aug. 19, 1975

[54] LAMINATED SAFETY GLASS AND/OR PLASTIC

[75] Inventors: Larry G. Wolgemuth, Cherry Hill; Benjamin C. Wilbur, Williamstown, both of N.J.

[73] Assignee: Atlantic Richfield Company, Philadelphia, Pa.

[22] Filed: Jan. 25, 1974

[21] Appl. No.: 436,429

Related U.S. Application Data

[63] Continuation-in-part of Ser. No. 359,822, May 14, 1973, abandoned.

[52] U.S. Cl. ........ 428/214; 260/307 A; 260/77.5 R; 428/215; 428/412; 428/424
[51] Int. Cl. ..................... C08g 22/04; B32b 27/40
[58] Field of Search ...... 260/307 A, 77.5 B, 77.5 R; 161/190; 117/161 KP

[56] References Cited
UNITED STATES PATENTS

| | | | |
|---|---|---|---|
| 3,620,905 | 11/1971 | Ahramjian | 161/190 |
| 3,652,507 | 3/1972 | Burk et al. | 260/77.5 B |
| 3,657,057 | 4/1972 | Shorr et al. | 161/190 |
| 3,702,320 | 11/1972 | Fritok et al. | 260/77.5 B |
| 3,718,535 | 2/1973 | Armstrong et al. | 161/190 |

*Primary Examiner*—George F. Lesmes
*Assistant Examiner*—R. J. Roche
*Attorney, Agent, or Firm*—John C. Martin, Jr.

[57] ABSTRACT

Laminated glass and/or plastic articles useful as safety glass windows and windshields of automotive vehicles and for other purposes are made with a thermoplastic polyurethane interlayer wherein the interlayer is the reaction product of a cyclic nitrile carbonate and at least one hydroxyl-containing compound selected from (1) a glycol such as a polyalkylene ether glycol or a polyester glycol having a number average molecular weight of from about 550 to about 4,000, and (2) a diol having primary or secondary hydroxyl groups and a molecular weight less than about 250.

22 Claims, No Drawings

LAMINATED SAFETY GLASS AND/OR PLASTIC

RELATED APPLICATIONS

This patent application is a continuation-in-part of Ser. No. 359,822 filed May 14, 1973, now abandoned.

BACKGROUND OF THE INVENTION

This invention relates to a safety glass improved by the use of a particular polyurethane elastomer interlayer. Safety glass commercially manufactured for automotive vehicles today is a glass sandwich having a sheet of transparent plastic, generally a polyvinyl butyral resin, interposed between two sheets or plates of glass with sufficient adhesion between the glass and transparent plastic that the breaking of the glass results in a minimum of delamination of fractured glass from the interlayer.

Safety glass having a polyurethane interlayer wherein the polyurethane is prepared from an organic isocyanate is known in the prior art and disclosed in numerous patents such as U.S. Pat. Nos. 3,509,015; 3,711,364; 3,388,032; 3,458,388; and 3,620,905, and Canadian Pat. No. 673,678. Despite the volume of publications in this technology, there are technical and economic disadvantages to employing an isocyanate to prepare the polyurethane. It is quite apparent that an effective interlayer for automotive safety glass use must have ability to adhere to the glass sheets, as well as good light transmission properties, optical clarity, and resistance to discoloration upon aging. That a polyurethane prepared from an aromatic isocyanate is susceptible to discoloration upon aging when exposed to light is known in the art. In addition, the safety glass must have good penetration resistance over the broad temperature range that automotive vehicles are normally exposed to.

Polyurethanes are conventionally prepared from isocyanates such as tolylene diisocyanate and a polyol that may be difunctional or trifunctional. However, polyurethanes prepared from such materials generally do not possess satisfactory ultraviolet light stability and will discolor following prolonged exposure to sunlight. Furthermore, use of a trifunctional polyol will cause crosslinking so that a thermoplastic polyurethane cannot be prepared. Although it is known that aging properties of aromatic isocyanate based polyurethanes may be improved by hydrogenating the aromatic isocyanate, this process involves an additional step and is economically disadvantageous.

It is an object of this invention to prepare a safety glass and/or plastic laminate interlayer having the desired properties of optical clarity, good adhesion to glass and/or plastic, resistance to discoloring on aging, minimum change of color caused by an ultraviolet light source such as sunlight, and a high impact energy absorption level over a wide temperature range wherein the interlayer for the safety glass is prepared by employing materials such as cyclic nitrile carbonates that will generate polyurethanes on reactions with a polyol. A further object of this invention is to provide a laminated glass and/or plastic article from the aforementioned interlayer wherein the interlayer that is sandwiched between the glass and/or plastic sheets is sufficiently adherent to the glass and/or plastic sheets, has good optical clarity, and good impact resistance over a wide temperature range.

Cyclic nitrile carbonates of the type employed in this invention are described in various U.S. patents, such as U.S. Pat. No. 3,531,425, whose disclosure is incorporated herein by reference. Polyurethane-type materials prepared from the aforementioned cyclic nitrile carbonates are also known in U.S. patents such as U.S. Pat. No. 3,652,507, whose disclosure is hereby incorporated by reference.

SUMMARY OF THE INVENTION

Accordingly, the present invention provides a laminated glass and/or plastic article wherein two layers of glass and/or plastic have an interlayer disposed between them of a thermoplastic polyurethane elastomer prepared from a. a cyclic nitrile carbonate compound having the formula

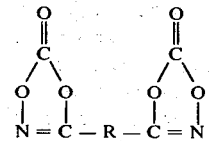

wherein R is an organic radical free of nucleophilic groups, and b. at least one hydroxyl-containing compound selected from the group consisting of (1) a glycol having a number average molecular weight of from about 550 to about 4,000 such as polyalkylene ether glycols and hydroxy terminated polyesters, and (2) a diol having primary or secondary aliphatic hydroxyl groups and a molecular weight less than about 250.

DESCRIPTION OF THE INVENTION

The high molecular weight glycols useful in preparing the thermoplastic polyurethane elastomers include both polyalkylene ether glycols and polyester glycols. These glycols generally have an average number molecular weight of about 550 to 4,000 and glycols having molecular weights of about 600 to 2,000 and particularly 800 to 2,000 are generally preferred.

"Polyalkylene ether glycols" as used throughout the specification and claims refers to a polyalkylene ether containing terminal hydroxy groups and are ordinarily derived from the polymerization of cyclic ethers such as alkylene oxides or dioxolane or from the condensation of glycols. They are sometimes known as polyalkylene glycols, polyalkylene oxide glycols, polyglycols or polyoxyalkylene diols. They may be represented by the formula $HO(RO)_nH$, in which R stands for an alkylene radical and $n$ is an integer greater than 1. In the polyethers useful in this invention, n is sufficiently large that the polyalkylene ether glycol has a molecular weight of at least 550. Not all the alkylene radicals present need be the same. Polyglycols formed by the copolymerization of a mixture of different alkylene oxides or glycols may be used, or the polyglycol may be derived from a cyclic ether such as dioxolane, which results in a product having the formula $HO(CH_2OC_2H_4O)_nH$. examples of compounds which contain diverse alkylene radicals and which are useful in the preparation of elastomers are those polyethers described in U.S. Pat. No. 2,492,955 to Ballard et al. which have molecular weights in the desired range.

Although a wide range of polyalkylene ether glycols are useful in this invention, the preferred glycol is polytetramethylene ether glycol.

The polyester glycols employed are essentially linear and hydroxyl terminated. Suitable polyester glycols include polycaprolactones and polyesters. The polycaprolactones are prepared by condensing caprolactone in the presence of minor amounts of difunctional active hydrogen compounds such as water or a low molecular weight glycol. Polyesters based on dicarboxylic acids and glycols can be derived by well-known esterification or trans-esterification procedures.

Generally the polyester glycols are obtained by an esterification of an aliphatic dicarboxylic acid or an anhydride thereof with a straight chain glycol containing 2 to 10 carbon atoms and having its hydroxyl groups on the terminal carbon atoms, in general, those glycols represented by the structure $HO(CH_2)_xOH$ wherein $x$ is 2 to 10 (preferably 2 to 6), such as ethylene glycol, 1,3-propanediol, 1,4-butanediol, 1,5-pentanediol, 1,6-hexanediol, and the like and mixtures thereof. Examples of the aliphatic, dibasic carboxylic acids utilized in preparing the polyester are adipic, succinic, pimelic, suberic azelaic, sebacic and the like, or their anhydrides. The dicarboxylic acid may be represented by the formula $HOOC(CH_2)nCOOH$, wherein $n$ is a number from 0 to 8, preferably 4 to 6. In the esterification reactions, molar ratios of more than 1 mol of glycol per mol of acid are preferred so as to obtain essentially linear chains containing a preponderance of terminal hydroxyl groups. The methods and details of manufacturing such polyesters are well known.

Diols useful in preparing the thermoplastic polyurethane elastomer of this invention are diols having a low molecular weight such as below 250 and having only primary or secondary aliphatic hydroxyl groups. Useful glycols in this category include the lower molecular weight glycols such as ethylene, propylene, butylene, pentylene, and the higher or substituted alkylenediols and various hydroxyl-substituted aryl compounds. Particularly useful are 1,2-propanediol; 1,4-butanediol; 1,3-propanediol; 1,5-pentanediol; neopentyl glycol; 2,2 bis (4-hydroxycyclohexane)propane; cis or trans 1,4-dihydroxy cyclohexane; bis(hydroxyethyl)isophthalate; bis(hydroxypropyl)isophthalate; ethylene oxide capped hydroquinone; and 1,4-di(β-hydroxyethoxy) benzene. Mixtures of two or more diols such as equimolar mixtures of 1,3-propanediol and 1,4-butanediol may also be used.

Cyclic nitrile carbonate compounds employed in this invention will have the structure

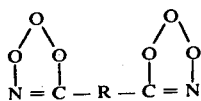

wherein R is a divalent hydrocarbon radical free of nucleophilic groups and is preferably an aliphatic hydrocarbon having from 1 to 50 carbon atoms and more often from 2 to 12 carbon atoms or a cycloaliphatic hydrocarbon radical having from 5 to 7 ring carbon atoms. R is generally a saturated hydrocarbon radical and may be straight or branched chain and can be substituted with non-interfering groups. Preferably, R is an alkyl or cycloalkyl but may be aralkylene, but not aryl. Examples of cyclic nitrile carbonates useful in this invention include such compounds as malonodi(nitrile carbonate); succinodi (nitrile carbonate); glutarodi(nitrile carbonate); adipodi (nitrile carbonate); pimelodi(nitrile carbonate); suberodi (nitrile carbonate); azelaodi(nitrile carbonate); sebacodi (nitrile carbonate); fumarodi(nitrile carbonate); itaconodi (nitrile carbonate); xerodi(nitrile carbonate); cetylmalonodi (nitrile carbonate); thapsodi(nitrile carbonate); japanodi (nitrile carbonate); dilinoleodi(nitrile carbonate); hexahydroisophthalodi(nitrile carbonate); and hexahydroterephthalodi(nitrile carbonate). A preferred cyclic nitrile carbonate compound is adipodi(nitrile carbonate) since it is commercially available.

The ratio of nitrole carbonate groups to hydroxyl-containing groups of the hydroxyl-containing compound usually is in the range of about 0.8 to 2:1; however, for preparation of the preferred thermoplastic elastomers of this invention, the ratio of nitrile carbonate groups to hydroxy-containing groups is ordinarily maintained near 1:1. When mixtures of different hydroxyl-containing compounds are employed in the reaction, they can be present in any desired mole ratio. For instance, when using mixtures of high molecular weight glycols and low molecular weight diols, such as mixtures of polytetramethylene ether glycol and 1,4-butanediol, the mole ratio of diol to glycol may range from 0.2 to 3:1 or more.

The thermoplastic polyurethane elastomers of this invention can be prepared by a variety of methods well known in the art such as 1-shot, quasi-prepolymer or full prepolymer procedures. As is well known in the art, a 1-shot procedure involves reacting simultaneously all components including the hydroxyl-containing compounds and cyclic nitrile carbonate compounds. In a full prepolymer procedure the cyclic nitrile carbonate is reacted with at least one hydroxyl-containing compound to prepare a hydroxyl-terminated prepolymer which is then reacted with the cyclic nitrile carbonate compound and any optional additional hydroxy-containing compound. In the quasi-prepolymer procedure the cyclic nitrile carbonate is reacted with a portion of the hydroxyl-containing compound and in a subsequent step the remaining part of the hydroxyl-containing compound is mixed with the prepolymer to finish the first step.

Suitable reaction temperatures for the polymerization to prepare the polyurethane may vary according to the particular reactants but generally will be from about 50°C. to 150°C., and preferably from about 80° to 120°C.

Suitable polyurethane forming catalysts are those sufficiently soluble in the reaction-mixture, preferably in the hydroxyl-group containing reactant, to provide catalytically-effective amounts of catalyst in solution in the reaction zone, and are represented by stannous salts of organic acids and organotin compounds as well as the catalysts used in the condensation-rearranging reaction taught in U.S. Pat. Nos. 3,652,507 and 3,702,320, the disclosures of which are incorporated herein by reference. Representative catalysts include stannous oleate, stannous octoate, dibutyltin diacetate, dibutyltin dilaurate, dibutyltin oxide, dibutyltin-dibutoxide, and bis(tributyltin oxide). The catalytically-effective amount of catalyst to be employed may vary from about 0.005 to 2.0 parts per 100 parts of the combined amount of hydroxyl-containing compound.

Following complete addition of the reactants, the reaction time may vary from about 1 to 24 hours, but generally from about 30 minutes to 8 hours.

Advantageously, a suitable organic solvent may be used such as normally liquid organic ethers and esters, acetonitrile and the like. A preferred solvent is dioxane.

The invention will be further illustrated by the following examples wherein parts percentages are by weight unless otherwise indicated.

EXAMPLE I

To a 2-liter resin kettle equipped with a stirrer, dry nitrogen sweep, condenser and controlled heat charge was added 523.17 grams of a polytetramethylene ether glycol having a hydroxyl number of 58.9 and an average number molecular weight of 2,000 and thereafter 1.47 grams of dibutyltin oxide and 1.83 grams sodium stearate were added. While maintaining stirring, the pressure was reduced to 30 mm. and the temperature rose to about 100°C. which was maintained for 45 minutes. Thereafter, dry nitrogen is re-introduced and the pressure allowed to rise to 1 atmosphere. To this system was added 32.94 grams of a 50% solution of 1,4-butanediol in dry dioxane. By means of a dropping funnel, a solution was charged to the reaction system containing 106.05 grams of adipodinitrile carbonate (3,3-tetramethylene) di(1,4,2-dioxazolone-5) dissolved in 150cc of dioxane. An additional 80cc of dioxane obtained from washing the containers of reactants was charged. Temperature was maintained at 100°C. for 30 to 35 minutes. An additional 500cc of dioxane was added in 30–55cc increments after 20 minutes to maintain the desired viscosity. The mixture was heated for a total of 4.5 hours following the adipodinitrile carbonate addition.

Thereafter, the polyurethane product was removed from the resin kettle, cut into small cubes and vacuum dried. The inherent viscosity measured at 30°C. at a concentration of 0.2 grams/100 ml of dimethyl formamide was 0.82. The polyurethane is milled at 250°F. and 0.5 wt. per cent of ditertiarybutylated phenol was added as an antioxidant during melting. The milled sheet is molded at 250°–260°F. into sheet form and analyzed for the physical properties described in Table I.

EXAMPLE II

In accordance with the procedure of Example I, a polyurethane product was prepared by charging 91.83 grams of a polytetramethylene ether glycol having a hydroxyl number of 111.8 and a number average molecular weight of about 1,000, 0.75 grams of dibutyltin di-n-butoxide and 0.61 grams of sodium stearate. After heating and stirring in accordance with the procedure of Example I, 10.98 grams of a 50 per cent solution of 1,4-butanediol was charged and thereafter a dioxane solution containing 35.35 grams of adipodinitrile carbonate was charged. Except for a total heating time of 5.3 hours following the adipodinitrile carbonate addition, the same procedures as Example I were employed. The polyurethane polymer obtained in this reaction had an inherent viscosity of 0.67 at 30°C. at a concentration of 0.2 grams/100 ml of dimethyl formamide. Following milling and molding at 250°–260°F., the polyurethane polymer had the physical property described in Table I.

EXAMPLE III

In accordance with the procedure of Example I, a thermoplastic polyurethane polymer was obtained by charging 185.65 grams of a hydroxyl-terminated, linear polyester [hydroxyl poly(tetramethylene adipate)] having a hydroxyl number of about 55.3, a number average molecular weight of about 1,000, and a functionality of 2.0, 1.10 grams of a catalyst prepared from the condensation product of dibutyltin oxide and dibutyltin dilaurate, and sodium t-butoxide such that the tin to sodium ratio is 1:1. Thereafter 10.98 grams of a 50 per cent solution of 1,4-butanediol in dry dioxane is charged and subsequently 35.35 grams of adipodinitrile carbonate dissolved in dry dioxane. The conditions and procedures of Example I were followed except that the total heating time following nitrile carbonate addition was 4.0 hours. The polyurethane polymer product had an inherent viscosity of 0.52 when measured in accordance with the procedure of Example I. The thermoplastic polyurethane product was dissolved in dioxane and cast from the solution to give a film having the properties defined in Table I.

EXAMPLE IV

In accordance with the procedure of Example III, the same reactants and conditions were again employed except that 99.67 grams of a hydroxyl terminated linear polyester glycol having a hydroxyl number of 103.0 and a number average molecular weight of about 1,000 was charged to the reaction together with 0.70 grams of the catalyst of Example III. Following the reaction the polymer had an inherent viscosity of 0.528 when measured in accordance with the procedure of Example I. The cast film had the properties defined in Table I.

TABLE I

TEST PROPERTIES

| EXAMPLE | Tear Resistance p.s.i.[1] | % Elongation[2] | Microtensile p.s.i.[2] | Short A Hardness | Tensile Impact ft.-lb./in. 5 lb. Hammer |
|---|---|---|---|---|---|
| I | 342 | 1350 | 4012 | 79 | 43(average) |
| II | 394 | 497 | 1826 | 90 | 11.5 |
| III | 350 | 860 | 2924 | — | 52 |
| IV | 550 | 647 | 3716 | — | 31.9 |

[1]Determined according to ASTM D-624-C.
[2]Determined according to ASTM D1708 except that Examples III and IV determined according to ASTM D-412-C.

Films about 12 inch by 12 inch by 0.026 inch of the thermoplastic polyurethane elastomer prepared in Examples I to IV are made by compression molding. The required weight of polyurethane polymer is placed in a mold consisting of polytetrafluoroethylene coated platens and a 12 inch by 12 inch chase, heating the mold for 10 minutes at 165°C. with just sufficient pressure to maintain contact between the polyurethane polymer and the platen, raising the pressure to 20 tons total force on same for 3 minutes to fill the mold uniformly and then cooling by circulating tap water through the pressed platens until the temperature reaches 30°C. The thermoplastic polyurethane elastomer sheets appear colorless to the unaided eye.

The films are conditioned by subjecting them to an atmosphere of 23 per cent relative humidity, then are laminated between 12 inch by 12 inch plates of ⅛ inch glass by placing the assembly between blotter cushions in a steamheated press at 175°C., maintaining about 35 p.s.i. (3½ inch ram) pressure for 6 minutes, increasing the pressure to 2,000 p.s.i. for 4 minutes, and then cooling under pressure. The laminates are autoclaved for 9 minutes at 135°C. and 225 p.s.i. in an autoclave. Commercially useful laminates are obtained.

The laminates may then be conditioned to 0°F., 73°F., and 120°F. and tested for penetration resistance and integrity by dropping a 5-pound (2.27 kg.) steel ball from various heights onto the laminates supported in a horizontal frame (American Standards Association Code Z-26, Test No. 5-26).

Possible color development upon aging may be tested in an ultraviolet light exposure test wherein sample laminates are exposed to both a mercury vapor lamp and a carbon arc (in a Fade-Ometer) and examined periodically for color change and other defects in the interlayer. A total exposure time up to 1,000 hours may be used.

The laminates may also be tested for adhesion to the outer sheets wherein a section of a sample laminate at a temperature such as 0°F. is broken by repeated hammer blows, and then the break is examined. The interlayer is considered so show proper adhesion to the outer sheet if no bare spots of plastic can be detected.

Optical properties may be measured by using a spectrophotometer wherein spectral curves are obtained for the sample laminates from which luminous transmittance can be determined. Also, haze measurements may be made which are based on the degree of scattering of an incident lightening.

At times it may be advantageous to further improve the adhesion of the thermoplastic polyurethane elastomer to the outer sheet.

It may be at times advantageous to coat the surface of the outer sheets of the laminate with a material which further improves the adhesion of the outer sheet to the polyurethane elastomer interlayer under high humidity or other severe conditions to improve adhesion of the outer sheet. Both water soluble and water-insoluble derivatives of certain polyorganosiloxanes may be employed to further improve the adhesion at the interlayer-outer sheet interface. These polyorganosiloxanes may be applied to the outer sheet surface by dipping or spraying followed by drying. By applying film-forming compositions having a metal salt, a metal organic compound or certain mixtures thereof capable of forming a metal oxide film according to the teachings of the prior art, films which moderate the radiant energy transmittance of viewing enclosures can be produced. Typical metal oxide coatings having low heat transmissivity by virtue of high reflectivity are those containing tin oxide, cadmium oxide, or mixtures thereof. Films containing cobalt oxide as the major ingredient with or without minor proportions of nickel oxide, mixtures of cobalt oxide with nickel and iron oxides, or mixturs of cobalt oxide with nickel and tin oxides may be effective.

Alternatively, it may be desirable to incorporate adhesion promoting agents into the polymerization recipe and such agents would include plasticizers such as the well known polyester plasticizers.

An additional means of improving adhesion of the polyurethane elastomer to the outer sheets is to coat either the polyurethane elastomer or the abutting outer sheets with an adhesive material prior to laminating and useful adhesive materials would include curable polyurethane compositions.

The thermoplastic polyurethane elastomer employed in this invention is very suitable for use as an interlayer in safety glass and/or plastic laminates wherein the sheet of the thermoplastic polyurethane is about 0.015 to 0.05 inches in thickness.

Glass sheets employed to form the glass and/or plastic laminates of this invention can be of any desired thickness and generally are from about 0.060 inches to about 0.50 inches in thickness and the glass plates can be formed from any of the types of glass generally employed for fabricating safety glass. Tempered glass may be used such as glass described in U.S. Pat. No. 2,799,136. This glass is sold under the trade name Chemcor by the Corning Glass Works. However, so called "float glass" is generally employed in safety glass and automotive windshields from float glass are described in U.S. Pat. No. 3,708,386.

According to this invention, it is also possible to laminate the thermoplastic polyurethane interlayer prepared from the aforementioned cyclic nitrile carbonates to a plastic outer sheet as is described in U.S. Pat. No. 3,657,057. Representative plastic outer sheets are rigid transparent plastics, generally known and useful as glass substitutes, such as a polycarbonate, for example, the polycarbonate sold under the trade name of LEXAN by the General Electric Co. of Schenectady, N.Y. or a poly(methylmethacrylate), for example, the poly(methylmethacrylate) sold under the trade name PLEXIGLAS by the Rohm and Haas Company of Philadelphia, Pa.

Generally, automotive safety glass now being used comprises a plastic interlayer sandwiched between outer layers of glass. However, automotive safety glass may also comprise the polyurethane interlayer of this invention sandwiched between one outer layer of glass and one outer layer of a rigid, transparent plastic sheet of either poly(methylmethacrylate) or polycarbonate. When used as safety glass or a windshield for automobiles, such a glass-interlayer-rigid plastic laminate has a glass exterior layer and a rigid plastic interior layer because of the superior abrasion and weathering resistance of glass and the low laceration factor of the rigid plastic.

We claim:

1. A laminated safety glass article comprising an interlayer of a preformed polyurethane elastomer sandwiched between a layer of glass and a second layer selected from the group consisting of glass and rigid transparent plastic wherein said polyurethane is the reaction product of
a. a cyclic nitrile carbonate compound having the formula

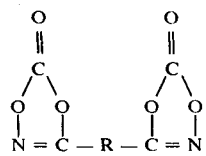

wherein R is a divalent hydrocarbon radical having about 1 to 50 carbon atoms, and b. at least one hydroxyl-containing compound selected from the group consisting of (1) a high molecular weight glycol having a number average molecular weight of from about 550 to about 4,000, and (2) a low molecular weight diol having primary or secondary aliphatic hydroxyl groups and a molecular weight less than about 250, said laminated article being the product of heating and pressing an assembly wherein said preformed elastomer sheet is in interposed relation with said layers.

2. A laminated article according to claim 1 wherein said glycol is a polyalkylene ether glycol.

3. A laminated article according to claim 1 wherein said glycol is a hydroxyl-terminated polyester.

4. A laminated article according to claim 2 wherein said polyalkylene ether glycol is a polytetramethylene ether glycol.

5. A laminated article according to claim 4 wherein said polytetramethylene ether glycol has a number average molecular weight from about 800 to about 2,000.

6. A laminated article according to claim 1 wherein said diol is 1,4-butanediol.

7. A laminated article according to claim 1 wherein R is a divalent hydrocarbon radical having about 2 to 12 carbon atoms.

8. A laminated article according to claim 1 wherein R is a hydrocarbon radical having 2 to 12 carbon atoms, said glycol is selected from the group consisting of polytetramethylene ether glycols and hydroxyl-terminated polyesters, and said diol is 1,4-butanediol.

9. A laminated article according to claim 8 wherein the mole ratio of said diol to said glycol is from 0.2 to 3:1.

10. A laminated article according to claim 1 wherein said interlayer has a thickness of about 0.015–0.05 inch.

11. A laminated article according to claim 1 wherein each layer of glass is about 0.05–0.5 inch in thickness.

12. A laminated article according to claim 1 wherein one outer layer is glass and another outer layer is a rigid plastic.

13. A laminated article according to claim 12 wherein said rigid plastic is poly(methylmethacrylate).

14. A laminated article according to claim 12 wherein said rigid plastic is polycarbonate.

15. A laminated safety glass article comprising an interlayer of a preformed polyurethane elastomer sandwiched between an outer layer of glass and another outer layer selected from the group consisting of glass and rigid, transparent plastic wherein said polyurethane is the reaction product of a. a cyclic nitrile carbonate compound having the formula

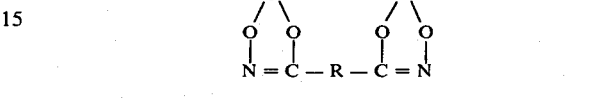

wherein R is a divalent hydrocarbon having about 1 to 50 carbon atoms, and b. at least two hydroxyl-containing compounds selected from the group consisting of (1) a high molecular weight glycol having a number average molecular weight of from about 550 to about 4,000, and (2) a low molecular weight diol having primary or secondary aliphatic hydroxyl groups and a molecular weight less than about 250, said laminated article being the product of heating and pressing an assembly wherein said preformed elastomer sheet is in interposed relation with said outer layers.

16. A laminated article according to claim 15 wherein R is a divalent hydrocarbon radical having 2 to 12 carbon atoms and said glycol is selected from the group consisting of polytetramethylene ether glycols and hydroxyl-terminated polyesters.

17. A laminated article according to claim 16 wherein said low molecular weight diol is 1,4-butanediol.

18. A laminated article according to claim 21 wherein said rigid plastic is polycarbonate.

19. A laminated article according to claim 15 wherein said rigid plastic is poly(methylmethacrylate).

20. A laminated article according to claim 15 wherein one layer is glass and another layer is rigid plastic.

21. A laminated article according to claim 20 wherein said rigid plastic is poly(methylmethacrylate).

22. A laminated article according to claim 20 wherein said rigid plastic is polycarbonate.

* * * * *